United States Patent
Lucky et al.

(10) Patent No.: US 9,512,772 B2
(45) Date of Patent: Dec. 6, 2016

(54) FLEXIBLE CONDUIT ASSEMBLY

(71) Applicant: Katcon USA, Inc., Auburn Hills, MI (US)

(72) Inventors: David Lucky, Flushing, MI (US); José De Nigris, Clarkston, MI (US)

(73) Assignee: KATCON USA, Inc., Auburn Hills, MI (US)

( * ) Notice: Subject to any disclaimer, the term of this patent is extended or adjusted under 35 U.S.C. 154(b) by 312 days.

(21) Appl. No.: 14/487,814

(22) Filed: Sep. 16, 2014

(65) Prior Publication Data

US 2015/0076814 A1     Mar. 19, 2015

Related U.S. Application Data

(60) Provisional application No. 61/878,136, filed on Sep. 16, 2013.

(51) Int. Cl.
  *F16L 27/11*   (2006.01)
  *F01N 13/18*   (2010.01)
  *F01N 13/14*   (2010.01)

(52) U.S. Cl.
  CPC ......... *F01N 13/1816* (2013.01); *F01N 13/143* (2013.01); *F01N 2470/12* (2013.01)

(58) Field of Classification Search
  CPC ...... F16L 27/11; F16L 27/111; F01N 13/1816; F01N 13/143

(Continued)

(56) References Cited

U.S. PATENT DOCUMENTS 3,219,365 A * 11/1965 Webb ............... F16L 27/111
                                                285/226
3,693,665 A      9/1972 Veerling et al.
(Continued)

FOREIGN PATENT DOCUMENTS

EP     0989289 A1    3/2000
EP     2525125 A1   11/2012
(Continued)

OTHER PUBLICATIONS

English language abstract and machine-assisted English language translation for JP2002-235538 extracted from espacenet.com database Oct. 17, 2014, 8 pages.

*Primary Examiner* — David E Bochna
(74) *Attorney, Agent, or Firm* — Howard & Howard Attorneys PLLC

(57) ABSTRACT

A flexible conduit assembly for transmitting exhaust from a combustion engine to an atmosphere includes first and second conduits and a coupler for coupling the first and second conduits. The coupler includes a bellows, a flexible intermediate element surrounding the bellows, first and second flanges disposed over the intermediate element, and an outer insulating element surrounding the intermediate element and supported by the flanges. The coupler further includes first and second extensions coupled to the intermediate element and projecting outwardly from the intermediate element. The first extension spaces the first flange from the intermediate element to define a first air gap, and the second extension spaces the second flange from the intermediate element to define a second air gap. The first and second flanges dispose a portion of the outer element above the intermediate element to define a third air gap.

23 Claims, 7 Drawing Sheets

(58) Field of Classification Search
USPC .......................................................... 285/226
See application file for complete search history.

(56) References Cited

U.S. PATENT DOCUMENTS

| | | | |
|---|---|---|---|
| 3,725,565 A * | 4/1973 | Schmidt | H01B 12/00 |
| | | | 285/226 |
| 3,864,909 A | 2/1975 | Kern | |
| 4,350,372 A | 9/1982 | Logsdon | |
| 4,515,397 A | 5/1985 | Nowobilski et al. | |
| 4,747,624 A | 5/1988 | Faber et al. | |
| 5,070,597 A | 12/1991 | Holt et al. | |
| 5,145,215 A | 9/1992 | Udell | |
| 5,340,165 A | 8/1994 | Sheppard | |
| 5,354,104 A | 10/1994 | Senes et al. | |
| 5,390,962 A | 2/1995 | Sekiguchi et al. | |
| 5,437,479 A * | 8/1995 | Hartling | F16L 27/111 |
| | | | 285/226 |
| 5,660,419 A | 8/1997 | Kim | |
| 5,791,696 A | 8/1998 | Miyajima et al. | |
| 5,813,704 A | 9/1998 | Naito | |
| 5,829,483 A | 11/1998 | Tukahara et al. | |
| 5,904,378 A | 5/1999 | Bakker et al. | |
| 6,155,303 A | 12/2000 | Krawietz et al. | |
| 6,464,258 B2 * | 10/2002 | Shin | F16L 27/11 |
| | | | 285/226 |
| 6,796,585 B1 | 9/2004 | Geldner | |
| 6,848,478 B2 | 2/2005 | Nagai | |
| 6,884,398 B1 * | 4/2005 | Biel, Jr. | B01D 53/9454 |
| | | | 422/177 |
| 6,902,204 B2 * | 6/2005 | Atanasoski | F01N 13/1816 |
| | | | 285/226 |
| 7,650,912 B2 | 1/2010 | Kim | |
| 8,122,914 B2 | 2/2012 | Menardo et al. | |
| 8,276,621 B2 | 10/2012 | Cachon et al. | |
| 2004/0036281 A1 * | 2/2004 | Kang | F16L 27/11 |
| | | | 285/226 |
| 2007/0035125 A1 * | 2/2007 | Kim | F16L 27/11 |
| | | | 285/226 |
| 2010/0007138 A1 | 1/2010 | Weiss et al. | |
| 2012/0056414 A1 | 3/2012 | Thomas et al. | |
| 2012/0112452 A1 | 5/2012 | Stalcup, II et al. | |
| 2012/0112453 A1 | 5/2012 | Stalcup, II et al. | |
| 2012/0279606 A1 | 11/2012 | Teso, Jr. et al. | |
| 2013/0015652 A1 | 1/2013 | Thomas et al. | |
| 2015/0076814 A1 * | 3/2015 | Lucky | F01N 13/143 |
| | | | 285/226 |

FOREIGN PATENT DOCUMENTS

| | | |
|---|---|---|
| JP | 2002-235538 A | 8/2002 |
| WO | WO9102143 A1 | 2/1991 |
| WO | WO2011061333 A1 | 5/2011 |
| WO | WO2011080561 A2 | 7/2011 |

* cited by examiner

FLEXIBLE CONDUIT ASSEMBLY

CROSS REFERENCE TO RELATED APPLICATIONS

This application claims priority to and all the benefits of U.S. Provisional Patent Application Ser. No. 61/878,136 filed on Sep. 16, 2013, the contents of which are expressly incorporated herein by reference in their entirety.

FIELD OF THE INVENTION

The present disclosure relates generally to flexible conduit assemblies and, more particularly, to a flexible conduit assembly for an exhaust system.

BACKGROUND

Flexible conduit assemblies may be utilized in a variety of applications, such as in an exhaust system of a vehicle. Typically, the flexible conduit assembly comprises a pair of conduits arranged in succession and a flexible coupler for coupling the conduits to one another. The flexible conduit assembly can typically withstand various movements, vibrations, and thermal stresses inside the vehicle while the vehicle is in use. However, the flexible conduit assembly may be exposed to debris such as dust particles, stones, grass, plant material, and/or the like. In some instances, the debris may contact or get trapped inside the coupler of the flexible conduit assembly while hot exhaust, generated from an internal combustion engine of the vehicle, is passing through the flexible conduit assembly.

SUMMARY

A flexible conduit assembly for transmitting exhaust from a combustion engine to an atmosphere comprises first and second conduits arranged in succession and a coupler for coupling said first and second conduits to one another. The coupler comprises a bellows having first and second bellows ends and a length extending between the bellows ends defining a longitudinal axis. The coupler further comprises a flexible intermediate element surrounding the bellows and having first and second end portions with the first bellows end in contact with the first end portion and the second bellows end in contact with the second end portion and a middle portion between said first and second end portions. The coupler further comprises a first flange disposed over the flexible intermediate element adjacent the first conduit, a second flange disposed over the flexible intermediate element adjacent the second conduit, and an outer insulating element surrounding at least the middle portion of the flexible intermediate element and having first and second outer ends supported by the flanges. The coupler further comprises a first extension coupled to the first end portion of the intermediate element and projecting outwardly from the intermediate element substantially transverse to said longitudinal axis with the first extension coupled to the first flange to space the first flange from the flexible intermediate element to define a first air gap between the first flange and the flexible intermediate element, and a second extension coupled to the second end portion of the intermediate element and projecting outwardly from the intermediate element substantially transverse to said longitudinal axis with the second extension coupled to the second flange to space the second flange from the flexible intermediate element to define a second air gap between the second flange and the flexible intermediate element. The first and second spaced flanges dispose a portion of the outer insulating element above the middle portion of the flexible intermediate element to define a third air gap between the middle portion and the outer insulating element for decreasing heat transfer between the outer insulating element and the flexible intermediate element when the exhaust transmits through said flexible conduit assembly.

BRIEF DESCRIPTION OF THE DRAWINGS

Advantages of the present disclosure will be readily appreciated, as the same becomes better understood by reference to the following detailed description, when considered in connection with the accompanying drawings. It is to be appreciated that the figures are merely illustrative and are not necessarily drawn to scale.

DETAILED DESCRIPTION

Figure 1:
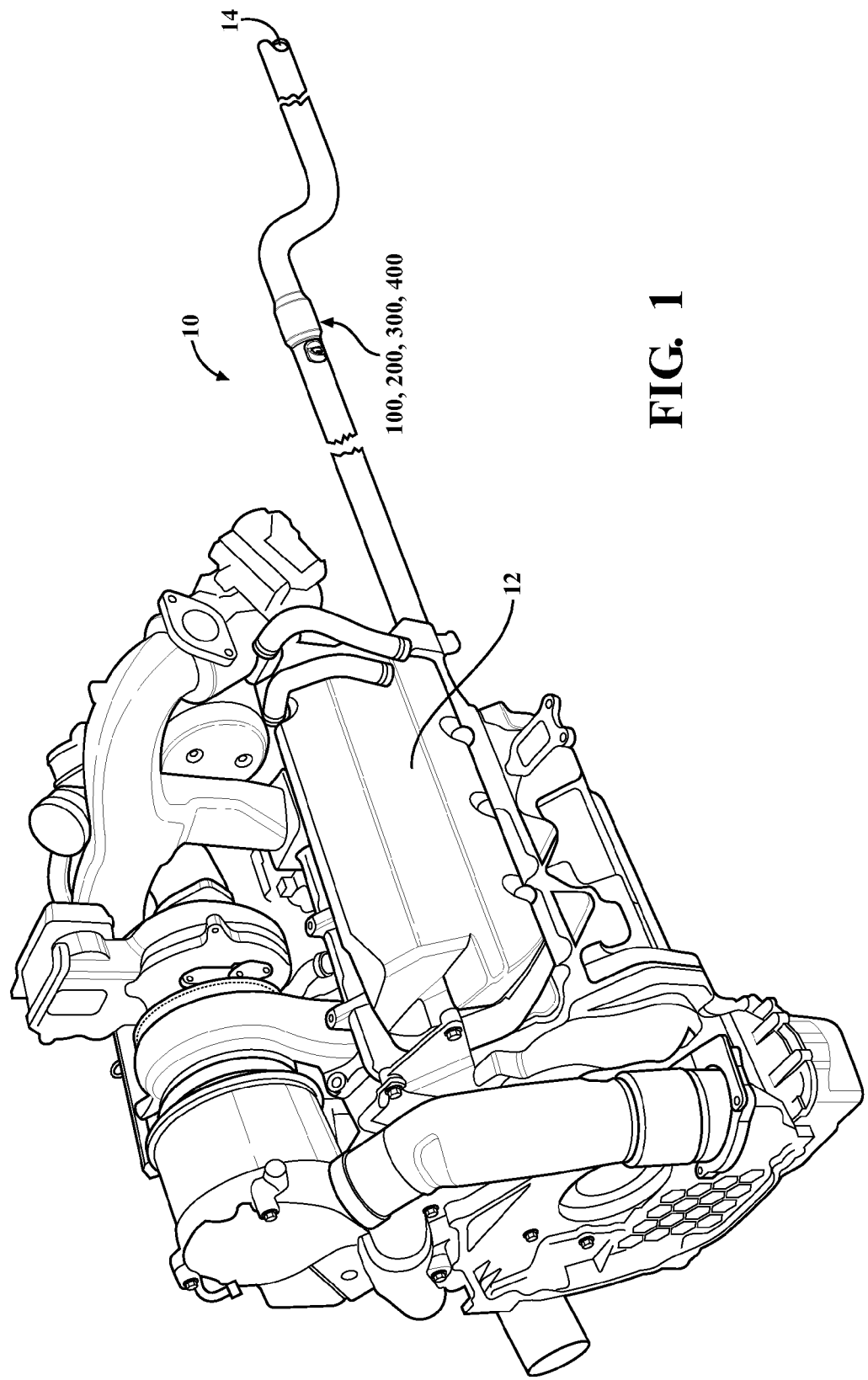
FIG. 1 is a perspective view of an exhaust system including an example of a flexible conduit assembly.
Figure 2A:
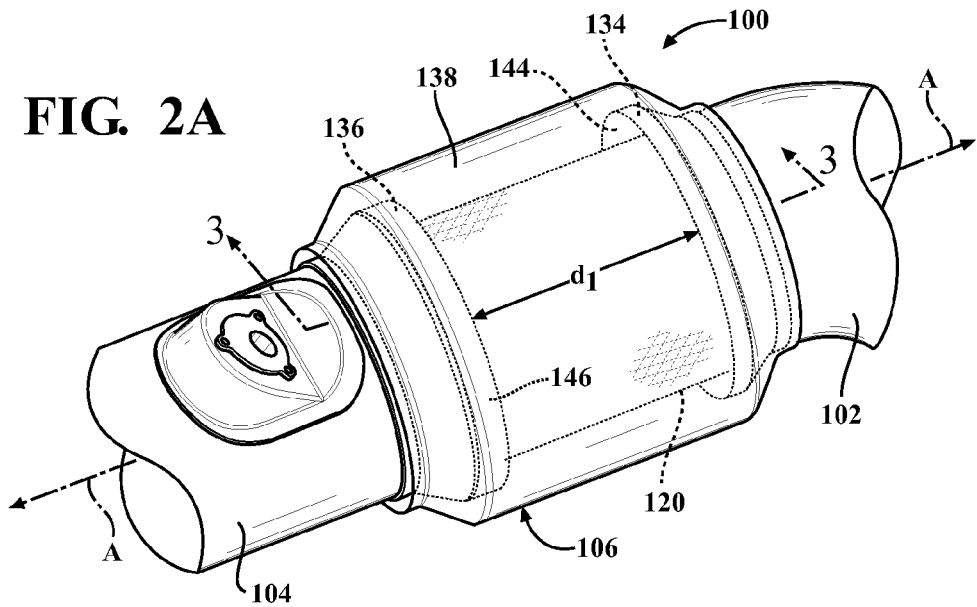
FIG. 2A is a perspective view of a flexible conduit assembly according to an embodiment of the present disclosure.
Figure 2B:
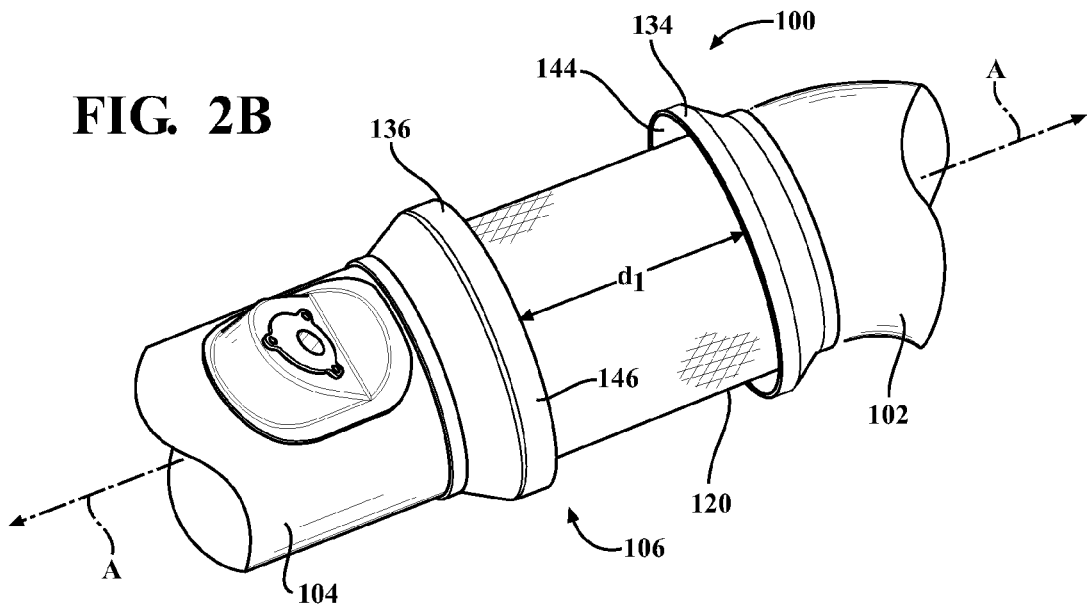
FIG. 2B is a perspective view of the flexible conduit assembly of FIG. 2A without the outer insulating element.
Figure 3:
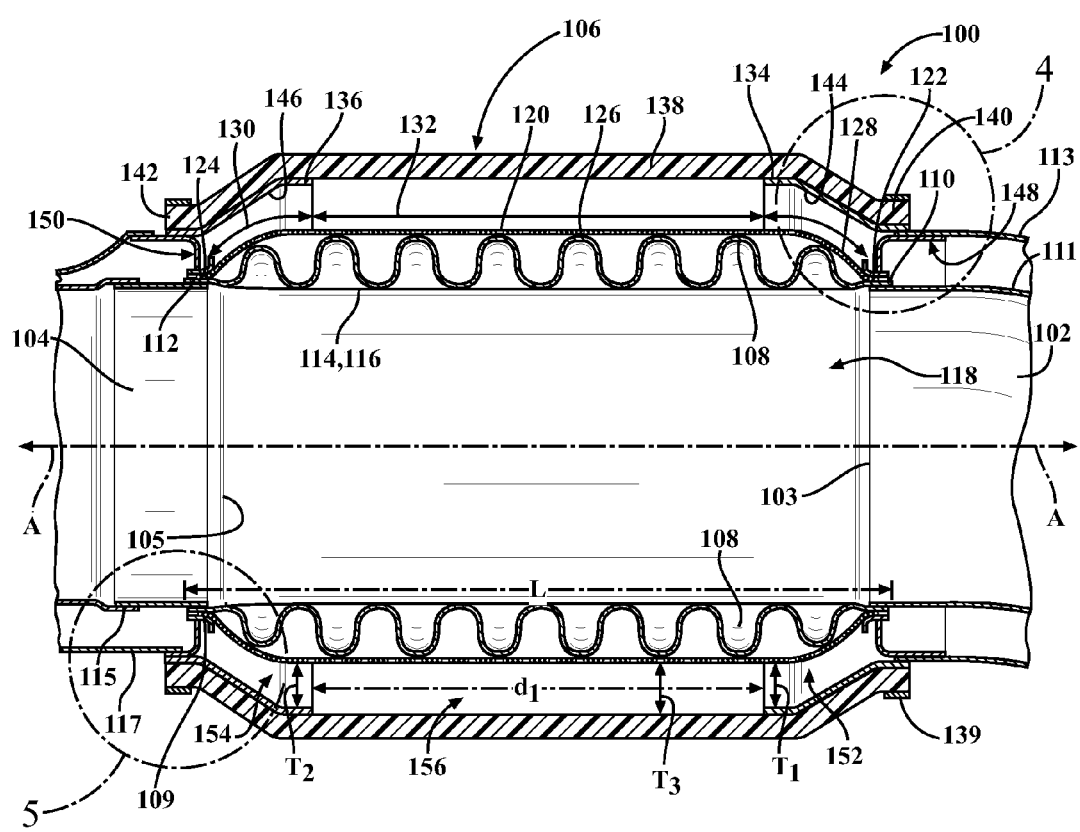
FIG. 3 is a cross-sectional view of the flexible conduit assembly of FIG. 2 taken along line 3-3.

Referring now to the figures, wherein like numerals indicate corresponding parts throughout the several views, various embodiments of the flexible conduit assembly 100, 200, 300, 400 are shown throughout the figures and are described in detail below. The flexible conduit assembly 100, 200, 300, 400 generally includes two conduits coupled to one another with a coupler. The flexible conduit assembly 100, 200, 300, 400 may be used in a variety of applications, such as in an exhaust system 10 of an agricultural vehicle (such as a tractor, a cultivator, a plow, a mower, etc.) or an automobile. An example of the exhaust system 10 including the flexible conduit assembly 100, 200, 300, 400 is shown in FIG. 1. Typically, the exhaust system 10 extends from an internal combustion engine 12 of the vehicle (not shown) to an exhaust outlet 14. As shown in FIG. 1, the flexible conduit assembly 100, 200, 300, 400 is incorporated into the exhaust system 100, 200, 300, 400 between the internal combustion engine 12 and the exhaust outlet 14 of the exhaust system 10. Typically, the flexible conduit assembly 100, 200, 300, 400 is used in the exhaust system 10 for transmitting exhaust generated by the internal combustion engine 12, through the piping of the exhaust system 10, and to an atmosphere external to the vehicle.

It is to be understood that the term coupled, as used herein, describes the direct or indirect attachment of two components.

Several embodiments of the flexible conduit assembly 100, 200, 300, 400 are described below. One embodiment of the flexible conduit assembly 100 is described with reference to FIGS. 2A, 2B and 3 through 5. The flexible conduit assembly 100 generally comprises first 102 and a second 104 conduits arranged in succession, and a coupler 106 for coupling the first 102 and second 104 conduits to one another. The term succession, as used herein, describes the arrangement of the first 102 and second 104 conduits as one conduit 102, 104 after the other. It is to be appreciated that the conduits 102, 104 may be arranged in succession when the conduits 102, 104 are arranged in line (as shown) or at an angle (such as 15°, 20°, 45°, etc.) with respect to one another.

The first 102 and second 104 conduits are typically designed to convey or transmit a material, such as exhaust. In an example, the first 102 and second 104 conduits are pipes, ducts, channels, tubes, or other similar structure for transmitting the exhaust from the combustion engine 12 to an atmosphere external to the vehicle. As shown, the first conduit 102 includes two conduits; a first inner conduit 111 and a second outer conduit 113. The inner conduit 111 is coupled (such as welded) to a bellows 108 at a first bellows end 110 and the outer conduit 113 is coupled (such as welded) to a first extension 148. Furthermore, the inner 111 and outer 113 conduits are spaced from one another. Typically, an insulating material is disposed between the inner 111 and outer 113 conduits. In the absence of the insulating material, the space between the inner 111 and outer 113 conduits defines an air gap. Typically, the air gap is sealed; however, there may be some leakage of air from between the inner 111 and outer 113 conduits into the coupler 106. Additionally, the second conduit 104 includes two conduits; a second inner conduit 115 and a second outer conduit 117. The inner conduit 115 is coupled (such as welded) to the bellows 108 at a second bellows end 112 and the outer conduit 117 is coupled (such as welded) to a second extension 150. Furthermore, the inner 115 and outer 117 conduits are spaced from one another. Typically, an insulating material is disposed between the inner 115 and outer 117 conduits. In the absence of the insulating material, the space between the inner 115 and outer 117 conduits defines an air gap. Typically, the air gap is sealed; however, there may be some leakage of air from between the inner 115 and outer 117 conduits into the coupler 106.

The coupler 106 is designed to couple the first 102 and second conduits 104 to one another. As shown, the conduits 102, 104 are arranged in line, and the coupler 106 couples an end 103 of the first conduit 102 and an end 105 of the second conduit 104. The coupler 106 is also designed to flex during movement of the vehicle. Accordingly, the coupler 106 is said to be flexible. The ability of the coupler 106 to flex typically reduces or even eliminates oscillatory, vibrational, and/or thermal stresses between the first 102 and second 104 conduits and/or between the conduits 102, 104 and one or more other components of the vehicle.

In an example, the coupler 106 comprises the bellows 108 made from or comprising a metal, such as stainless steel. The bellows 108 has first 110 and second 112 bellows ends and a bellows length L extending between the bellows ends 110, 112 and defining a longitudinal axis A. As shown, the bellows 108 is a cylindrical or tubular device having concertinaed sides that allow the device to expand and contract along the longitudinal axis A. Additionally, the bellows 108 has a collar 109, which is further described below. In an example, the bellows 108 compresses when a pressure is applied to the device, and the bellows 108 expands when a pressure is removed from the device. Typically, the bellows 108 is used in the coupler 106 of the flexible conduit assembly 100 to compensate for movements (such as oscillations and/or vibrations) and thermal differences inside the coupler 106 during operation and/or movement of the vehicle.

In an example, the bellows 108 comprises at least one flexible wall 114 defining a continuous inner surface 116 of the coupler 106. The continuous inner surface 116 of the coupler 106 is considered to be flexible (by virtue of the flexible wall 114) so that the continuous inner surface 116 can flex to withstand various movements (such as oscillations and/or vibrations), etc. within the coupler 106 during operation and/or movement of the vehicle. In an example, the flexible wall 114 is a single continuous wall, which forms the continuous inner surface 116 of the coupler 106. In another example, the flexible wall 114 is a plurality of walls (such as two or more walls 114) coupled to one another to form the continuous inner surface 116 of the coupler 106. The continuous inner surface 116 of the coupler 106 (formed by the flexible wall(s) 114) defines a bore 118 inside the coupler 106 through which exhaust generated by the combustion engine 12 can pass through. For example, the exhaust generated by the combustion engine 12 can pass through the conduit 104, through the bore 118, and through the conduit 102 toward the exhaust outlet 14.

The shape of the bore 118 is typically dictated by the shape of the continuous inner surface 116 of the coupler 106. In an example, the bore 118 has a cylindrical shape. It is to be appreciated, however, that the bore 118 can have any shape so long as the exhaust can suitable pass through the bore 118. In an example, the shape of the bore 118 is similar to the shape of the conduits 102, 104. Additionally, in another example, the bore 118 has a diameter that is substantially the same as the diameter of the conduits 102, 104. Additionally, the bore 118 may be aligned with the first 102 and second 104 conduits and extends along the longitudinal axis A.

The coupler 106 further comprises a flexible intermediate element 120 surrounding the bellows 108. The flexible intermediate element 120 is used to structurally support the bellows 108, and may be formed from or include any suitable material so long as the flexible intermediate element 120 can flex. In an example, the flexible intermediate element 120 is formed from or includes a braided metal.

The flexible intermediate element 120 has first 122 and second 124 end portions. The first bellows end 110 is in contact with the first end portion 122 and the second bellows end 112 is in contact with the second end portion 124. In an example, the first end portion 122 is coupled to the first bellows end 110 and the second end portion 124 is coupled to the second bellows end 112. Coupling of the first end portion 122 to the first bellows end 110 and coupling of the second end portion 124 to the second bellows end 112 may be accomplished chemically (such as by using an adhesive), metallurgically (such as by welding) and/or mechanically (such as by using a fastener).

The flexible intermediate element 120 further has a middle portion 126 between the first 122 and second 124 end portions. The middle portion 126 may be divided up into segments; such as a first end segment 128 adjacent the first end portion 122 of the intermediate element 120, a second end segment 130 adjacent the second end portion 124 of the intermediate element 120, and a remaining segment 132 between the first 128 and second 130 end segments.

The coupler 106 further comprises a first flange 134 disposed over the flexible intermediate element 120 adjacent the first conduit 102, a second flange 136 disposed over the flexible intermediate element 120 adjacent the second conduit 104, and an outer insulating element 138 surrounding at least the middle portion 126 of the flexible intermediate element 120. In an example, the first flange 134 is also disposed over the first conduit 102 and the second flange 136 is also disposed over the second conduit 104. The outer insulating element 138 has first 140 and second 142 outer ends supported by the first 134 and second 136 flanges, respectively.

The outer insulating element 138 may be a soft insulating cover. The outer insulating element 138 may, for example, be formed of any soft material that effectively attenuates noise, resists the transmission of heat, and/or dampens vibration. In an example, the outer insulating element 138 has a single layer of insulating material. In another example, the outer insulating element 138 has multiple layers of insulating material. The outer insulating element 138 may have, for example, a first layer of silicone and a second layer of super wool. Alternatively, the outer insulating element 138 may have, for example, a first layer of a woven fabric with an alumized coating, a second layer of high temperature glass, and a third layer of a woven fabric. In these examples, the outer insulating element 138 may further have a protecting surface, such as a wire mesh.

As shown, the first 134 and second 136 flanges are disposed between the flexible intermediate element 120 and the outer insulating element 138 to space the outer insulating element 138 from the flexible intermediate element 120. Accordingly, the first 134 and second 136 flanges may be referred to as spacers. In the present embodiment, each of the first 134 and second 136 flanges extend over the respective first 128 and second 130 end segments of the flexible intermediate element 120 and exposes the remaining segment 132 of the flexible intermediate element 120. Additionally, the first flange 134 surrounds the first end portion 122 of the flexible intermediate element 120 and surrounds the first end segment 128 of the middle portion 126 of the intermediate element 120, and the second flange 136 surrounds the second end portion 124 of the flexible intermediate element 120 and surrounds the second end segment 130 of the middle portion 126 of the intermediate element 120. Further, the first 134 and second 136 flanges are spaced a first distance $d_1$ from one another.

In an example, the first flange 134 has a shape that is consistent with the shape of the first end segment 128 of the middle portion 126 of the flexible intermediate element 120. Further, the second flange 136 has a shape that is consistent with the shape of the second end segment 130 of the middle portion 126 of the flexible intermediate element 120. As shown, each of the first 128 and second 130 end segments of the middle portion 126 of the flexible intermediate element 120 has a sloped portion. In the example shown, each of the first 134 and second 136 flanges also has a sloped portion that is consistent with the first 128 and second 130 end segments, respectively. In an example, the first flange 134 has at least one wall 144 with a portion of the wall 144 being sloped and the wall 144 defining a cylindrical shape, and the second flange 136 has at least one wall 146 with a portion of the wall 146 being sloped and the wall 146 defining a cylindrical shape. In an example, each of the first 134 and second 136 flanges have a continuous wall 144, 146 without seams. In another example, each of the first 134 and second 136 flanges have two or more walls 144, 146 coupled together forming one or more seams. In this example, a wire lace or Velcro® straps may be used to close any seams of the walls 144, 146.

The coupler 106 further comprises a first 148 and second 150 extensions coupled to the first 122 and second 124 end portions of the flexible intermediate element 120, respectively. As shown at least in FIGS. 3 through 5, each of the first 148 and second 150 extensions project outwardly from the flexible intermediate element 120 substantially traverse to the longitudinal axis A. The first extension 148 is coupled to the first flange 134 to space the first flange 134 from the flexible intermediate element 120 to define a first air gap 152 between the first flange 134 and the flexible intermediate element 120. The second extension 150 is coupled to the second flange 136 to space the second flange 136 from the flexible intermediate element 120 to define a second air gap 154 between the first flange 134 and the flexible intermediate element 120. In an example, and as shown, the first outer conduit 113 is directly attached to the first extension 148, and the first flange 134 is directly attached to the first outer conduit 113, and the second outer conduit 117 is directly attached to the second extension 150, and the second flange 136 is directly attached to the second outer conduit 117. Additionally, the first 134 and second 136 flanges dispose a portion of the outer insulating element 138 above the middle portion 126 of the flexible intermediate element 120 to define a third air gap 156 between the middle portion 126 and the outer insulating element 138. The first air gap 152 and the second air gap 154 are fluidly continuous with the third air gap 156. Accordingly, the first 152 and second 154 air gaps are open to the third air gap 156.

Figure 4:
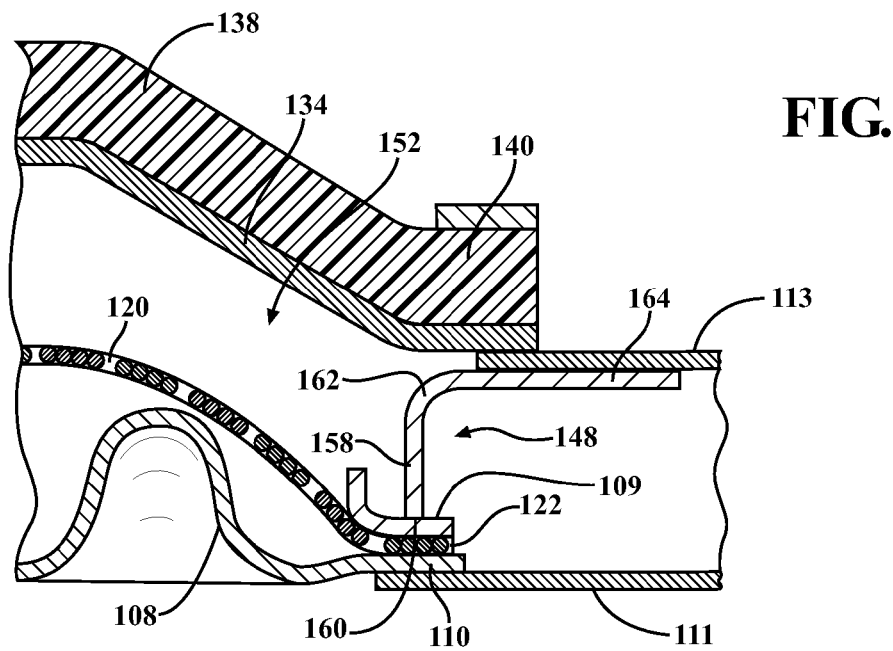
FIG. 4 is an enlarged cross-sectional view of a portion of the flexible conduit assembly of FIG. 3.

In an example, and as shown at least in FIG. 4, the first extension 148 has a first leg 158 having first 160 and second 162 leg ends. As shown, the first leg end 160 is coupled to the first end portion 122 of the flexible intermediate element 120 and the first leg 158 extends from the first end portion 122 of the flexible intermediate element 120 in a direction substantially transverse to the first end portion 122. In instances where the first end portion 122 extends substantially parallel to the longitudinal axis A (as shown), the first leg 158 also extends from the first end portion 122 in a direction substantially transverse to the longitudinal axis A. The first leg 158 extending from the first end portion 122 in a direction substantially transverse to the first end portion 122 means that the first leg 158 extends from the first end portion 122 at any angle greater than 0° and less than 180° relative to the first end portion 122. In an example, the first leg 158 extends in a direction substantially transverse to the first end portion 122 when the first leg 158 extends perpendicularly (about 90°) from the first end portion 122. The first extension 148 further has a second leg 164 coupled to the first leg 158 at the second leg end 162 and extends from the first leg 158 in a direction substantially transverse to the first leg 158. The second leg 164 extending from the first leg 158 in a direction substantially transverse to the first leg 158 means that the second leg 164 extends from the first leg 158 at any angle greater than 0° and less than 180° relative to the first leg 158. In an example, the second leg 164 extends in a direction substantially transverse to the first leg 158 when the second leg 164 extends perpendicularly (about 90°) from the first leg 158. In an example, the first leg 158 forms a substantially sharp right angle with the second leg 164 at the second leg end 162. In another example, and as shown, the second leg end 162 is a bend so that the first leg 158 bends into the second leg 164.

Figure 5:
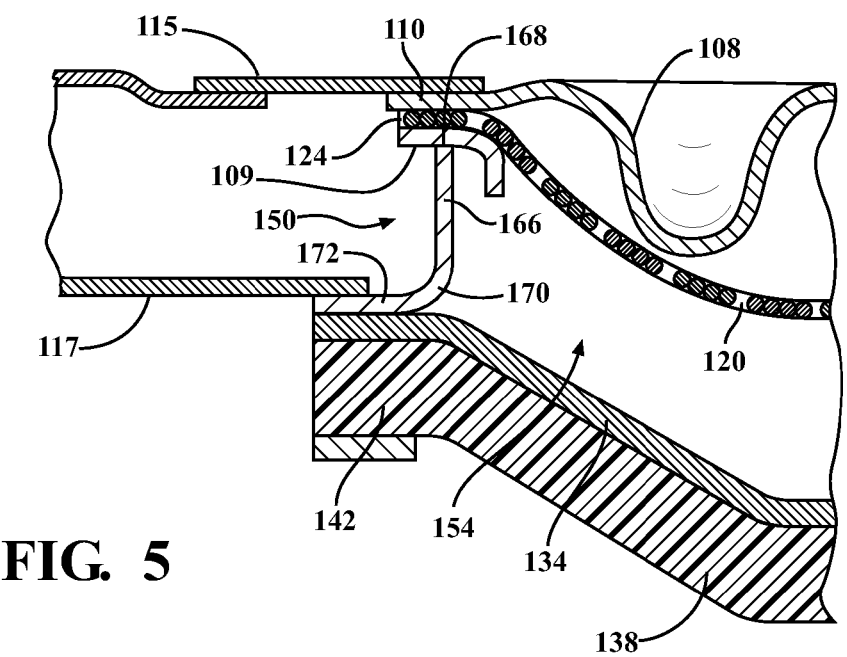
FIG. 5 is an enlarged cross-sectional view of another portion of the flexible conduit assembly of FIG. 3.

As shown at least in FIG. 5, the second extension 150 has a third leg 166 having third 168 and fourth 170 leg ends. As shown, the third leg end 168 is coupled to the second end portion 124 of the flexible intermediate element 120 and the third leg 166 extends from the second end portion 124 of the flexible intermediate element 120 in a direction substantially transverse to the second end portion 124. In instances where the second end portion 124 extends substantially parallel to the longitudinal axis A, the third leg 166 also extends from the second end portion 124 in a direction substantially transverse to the longitudinal axis A. The third leg 166 extending from the second end portion 124 in a direction substantially transverse to the second end portion 124 means that the third leg 166 extends from the second end portion 124 at any angle greater than 0° and less than 180° relative to the second end portion 124. In an example, the third leg 166 extends in a direction substantially transverse to the second end portion 124 when the third leg 166 extends perpendicularly (about 90°) from the second end portion 124. The second extension 150 further has a fourth leg 172 coupled to the third leg 166 at the fourth leg end 170 and extends from the third leg 166 in a direction substantially transverse to the third leg 166. The fourth leg 172 extending from the third leg 166 in a direction substantially transverse to the third leg 166 means that the fourth leg 172 extends from the third leg 166 at any angle greater than 0° and less than 180° relative to the third leg 166. In an example, the fourth leg 172 extends in a direction substantially transverse to the third leg 166 when the fourth leg 172 extends perpendicularly (about 90°) from the third leg 166. In an example, the third leg 166 forms a substantially sharp right angle with the fourth leg 172 at the fourth leg end 170. In another example, and as shown, the fourth leg end 170 is a bend so that the third leg 166 bends into the fourth leg 172.

As shown, the first 148 and second 150 extensions are spaced from the first inner conduit 111 and the second inner conduit 113, respectively. Additionally, the first 148 and second 150 extensions are coupled to the first 122 and second 124 end portions of the flexible intermediate element 120. The collar 109 is utilized to couple the bellows 108 and the flexible intermediate element 120 to one another, and the first 148 and second 150 extensions are directly attached (such as welded) to the collar 109.

Furthermore, the outer insulating element 138 is directly attached (e.g., chemically, metallurgically, and/or mechanically) to each of the first 134 and second 136 flanges, and the first 134 and second 136 flanges are directly attached (e.g., chemically, metallurgically, and/or mechanically) to the first 102 and second 104 conduits, respectively. In an example, the outer insulating element 138 is mechanically coupled to the flanges 134, 136, such as by utilizing one or more clamps or straps 139.

In an example, the flanges 134, 136 are used in the flexible conduit assembly 100 to lift the outer insulation element 138 off the bellows 108 so that the bellows 108 remains flexible, e.g., can contract and expand as necessary. Additionally, the flanges 134, 136 are used to improve or maintain the durability of the flexible conduit assembly 100.

As previously mentioned, the coupler 106 further comprises a first air gap 152 defined between the first flange 134 and the flexible intermediate element 120 and a second air gap 154 defined between the second flange 136 and the flexible intermediate element 120. The first 152 and second 152 air gaps have respective first $T_1$ and second $T_2$ thicknesses. In an example, the first thickness $T_1$ and the second thickness $T_2$ are substantially the same. The first $T_1$ and second $T_2$ thicknesses are substantially the same when the first thickness $T_1$ is close to or is exactly the same as the second thickness $T_2$. In an example, the first 152 and second 154 air gaps each have a length, and the first $T_1$ and second $T_2$ thicknesses are substantially the same along the length of the first 152 and second 154 air gaps, respectively.

Furthermore, the third air gap 154 which is between the middle portion 126 of the flexible intermediate element 120 and the outer insulating element 138 has a third thickness $T_3$. In an example, the first thickness $T_1$ of the first air gap 152 and the second thickness $T_2$ of the second air gap 154 are smaller than the third thickness $T_3$ of the third air gap 156.

The third air gap 156 generally prevents the outer insulating element 138 from contacting or touching the flexible intermediate element 120. The third air gap 156 also serves as an adiabatic layer in that the third air gap 156 decreases heat transfer between the outer insulating element 138 and the flexible intermediate element 120 when exhaust transmits through the flexible conduit assembly 100. In this way, the presence of the third air gap 156 enables the outer insulating element 138 to stay at or below a certain temperature (such as below 230° C.). This may reduce or even eliminate potential hazards, such as fire hazards caused from debris coming into contact with the outer insulating element 138. Additionally, by the present design of the flexible conduit assembly 100, debris is unable to enter hot zones or areas inside the flexible conduit assembly 100, such as where the exhaust is present.

It is to be understood that the individual components of the coupler 106, such as the flexible intermediate element 120, the outer insulating element 138, etc., are installed or provided with extra length to allow the bellows 108 to expand when the flexible conduit assembly 100 is in use.

Figure 6:
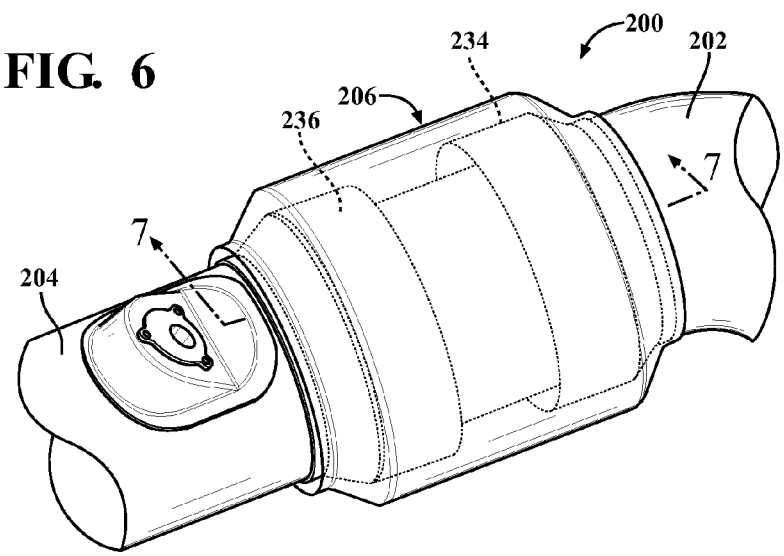
FIG. 6 is a perspective view of the flexible conduit assembly according to another embodiment of the present disclosure.
Figure 7:
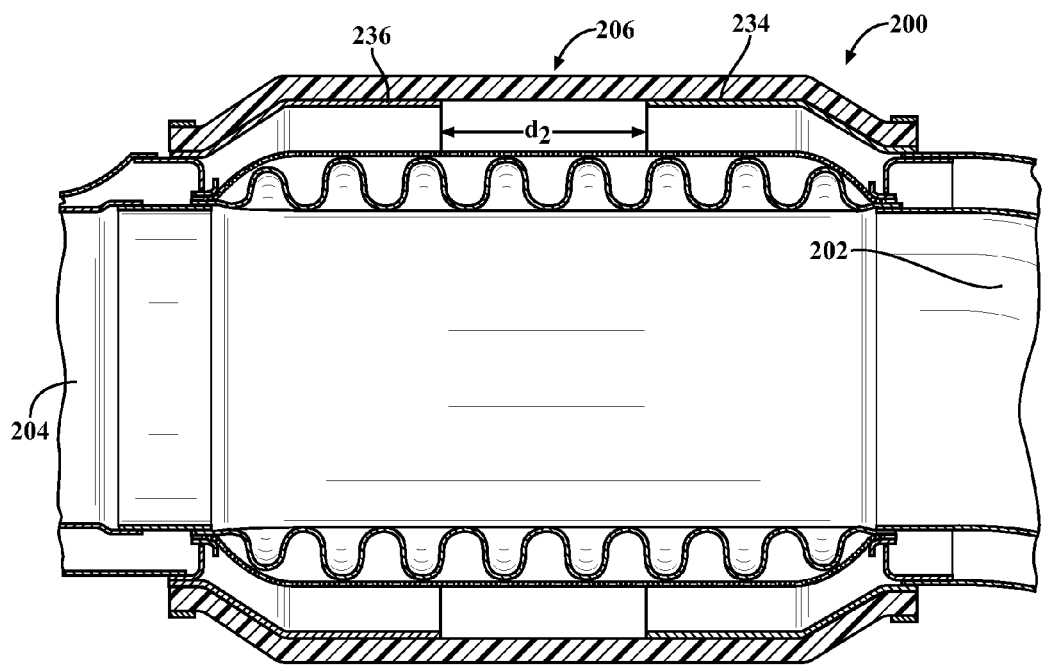
FIG. 7 is a cross-sectional view of the flexible conduit assembly of FIG. 6 taken along line 7-7.

Another embodiment of the flexible conduit assembly 200 is described with reference to FIGS. 6 and 7. The flexible conduit assembly 200 comprises first 202 and second 204 conduits arranged in succession, and a coupler 206 for coupling the conduits 202, 204 to one another. The coupler 206 is similar to the coupler 106 described above with reference to FIGS. 2A, 2B, and 3 through 5; however, the first 234 and second 236 flanges of the coupler 206 are longer in length. Said differently, the length of the first flange 234 of the coupler 206 is longer in length than the first flange 134 of the coupler 106, and the length of the second flange 236 of the coupler 206 is longer in length than the second flange 136 of the coupler 106. The first 234 and second 236 flanges of the coupler 206 are spaced a distance $d_2$ apart from one another, and the distance $d_2$ is shorter than the distance $d_1$ defining the space between the first 134 and second 136 flanges of the coupler 106 described above with reference to FIGS. 2A, 2B, and 3 through 5. The longer flanges 234, 236 allows for additional flexibility of the bellows 208, such as for further expansion and contraction during use of the flexible conduit assembly 200.

Figure 8:
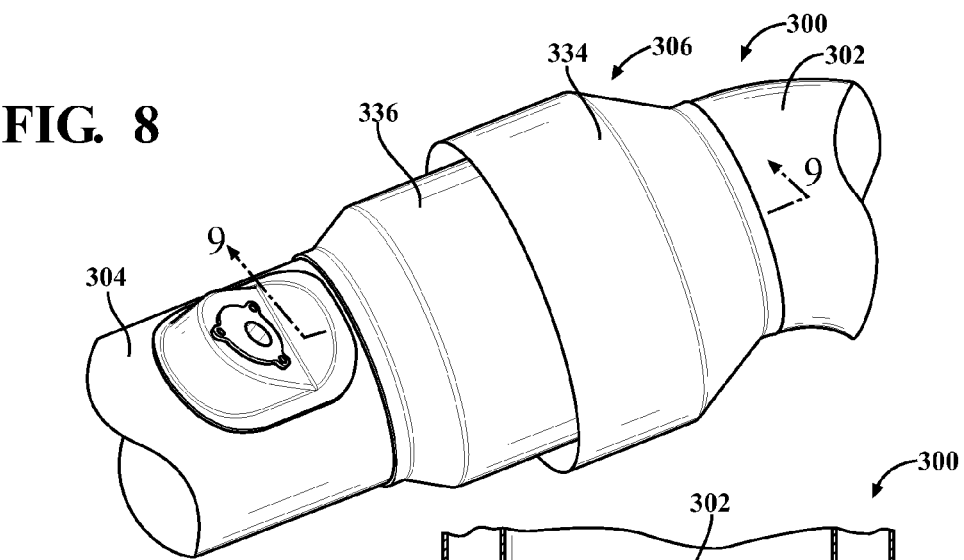
FIG. 8 is a perspective view of the flexible conduit assembly according to yet another embodiment of the present disclosure.
Figure 9:
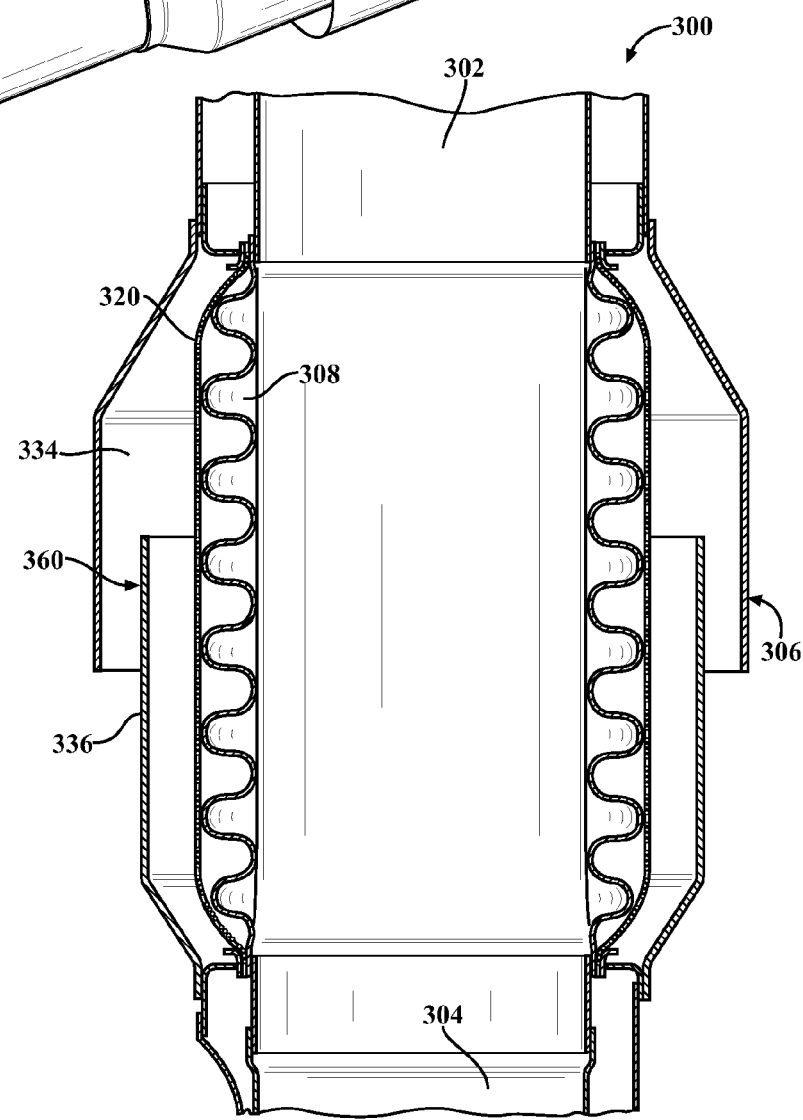
FIG. 9 is a cross-sectional view of the flexible conduit assembly of FIG. 8 taken along line 9-9.

Another embodiment of the flexible conduit assembly 300 is described with reference to FIGS. 8 and 9. In this embodiment, the flexible conduit assembly 300 comprises first 302 and second 304 conduits, and a coupler 306 for coupling the first 302 and second 304 conduits to one another. The coupler 306 comprises a bellows 308 and a flexible intermediate element 320 surrounding the bellows 308. The bellows 308 and the flexible intermediate element 320 are the same as in the previously described embodiments. The coupler 306 further comprises first 334 and second 336 flanges. In this embodiment, the second flange 336 extends at least partially across the flexible intermediate element 320 and the first flange 334 extends at least partially across the second flange 336. Alternatively, the first flange 334 extends at least partially across the flexible intermediate element 320 and the second flange 336 extends at least partially across the first flange 334. As shown, a portion of the second flange 336 overlaps the first flange 334 leaving an air gap 360 between the flanges 334, 336. With this design, debris typically gets trapped and/or contained within the air gap 360 so that the debris does not enter hot zones or areas inside the flexible conduit assembly 300, such as where the exhaust is present. Additionally, the overlapping design of the flanges 334, 336 allows for full range of motion of the flexible conduit assembly 300. It is believed that this is due, at least in part, to the overlap of the flanges 334, 336 proximate to the center of the coupler 306.

Figure 10:
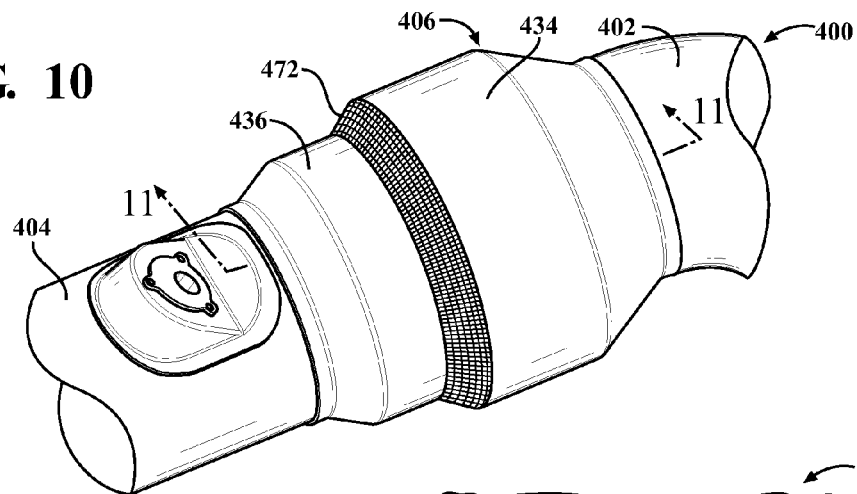
FIG. 10 is a perspective view of the flexible conduit assembly according to still another embodiment of the present disclosure.
Figure 11:
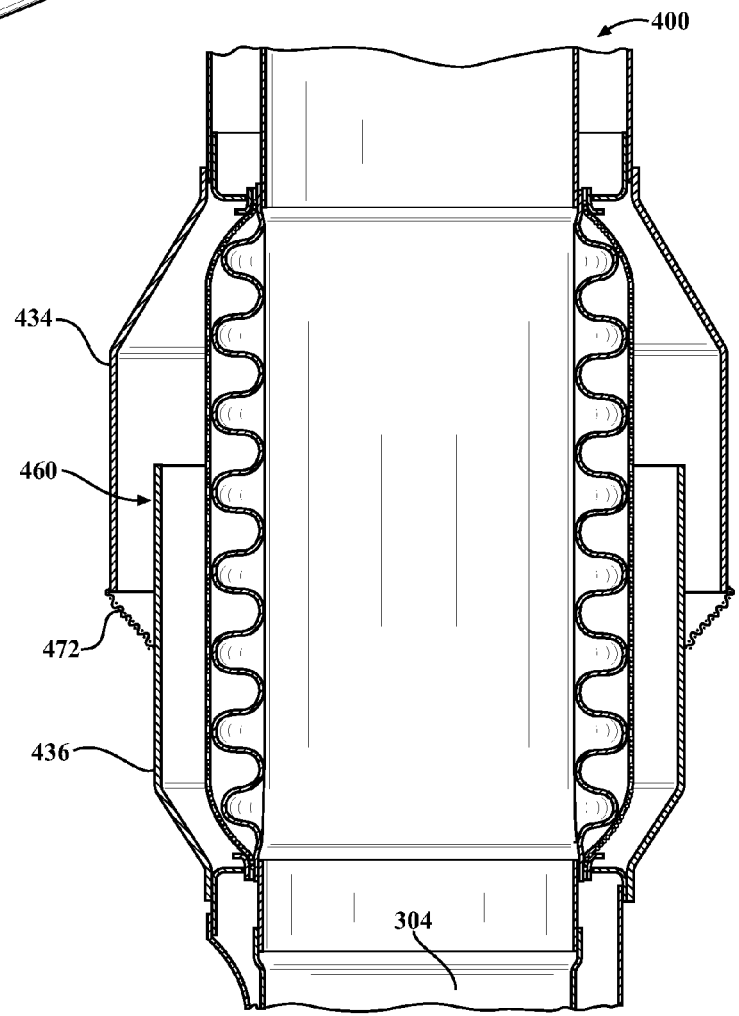
FIG. 11 is a cross-sectional view of the flexible conduit assembly of FIG. 10 taken along line 11-11.

Yet another embodiment of the flexible conduit assembly 400 is described with reference to FIGS. 10 and 11. The flexible conduit assembly 400 comprises first 402 and second 404 conduits, and a coupler 406 for coupling the first 402 and second 404 conduits to one another. The coupler 406 of the flexible conduit assembly 400 is similar to the coupler 300 of the flexible conduit assembly 300 described above. However, in this embodiment, the coupler 406 further comprises a cover element 472, such as a wire mesh, which is coupled to the first 434 and second 436 flanges and covering an air gap 460. In an example, the cover element 472 is coupled to the flanges 434, 436 with some tolerance or slack so that the coupler 406 remains flexible or moveable. Additionally, where the cover element 472 is a wire mesh, the cover element 472 reduces or even prevents debris from entering the air gap 470 between the first 434 and second 436 flanges.

While the invention has been described with reference to the examples above, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all examples falling within the scope of the appended claims.

What is claimed is:

1. A flexible conduit assembly for transmitting exhaust from a combustion engine to an atmosphere, said flexible conduit assembly comprising:
    first and second conduits arranged in succession; and
    a coupler for coupling said first and second conduits to one another, said coupler comprising:
        a bellows having first and second bellows ends and a bellows length extending between said bellows ends defining a longitudinal axis;
        a flexible intermediate element surrounding said bellows and having first and second end portions with said first bellows end in contact with said first end portion and said second bellows end in contact with said second end portion, and a middle portion between said first and second end portions;
        a first flange disposed over said flexible intermediate element adjacent said first conduit;
        a second flange disposed over said flexible intermediate element adjacent said second conduit;
        an outer insulating element surrounding at least said middle portion of said flexible intermediate element and having first and second outer ends supported by said flanges;
        a first extension coupled to said first end portion of said intermediate element and projecting outwardly from said intermediate element substantially transverse to said longitudinal axis with said first extension coupled to said first flange to space said first flange from said flexible intermediate element to define a first air gap between said first flange and said flexible intermediate element; and
        a second extension coupled to said second end portion of said intermediate element and projecting outwardly from said intermediate element substantially transverse to said longitudinal axis with said second extension coupled to said second flange to space said second flange from said flexible intermediate element to define a second air gap between said second flange and said flexible intermediate element;
        wherein said first and second spaced flanges dispose a portion of said outer insulating element above said middle portion of said flexible intermediate element to define a third air gap between said middle portion and said outer insulating element for decreasing heat transfer between said outer insulating element and said flexible intermediate element when the exhaust transmits through said flexible conduit assembly.

2. The flexible conduit assembly as set forth in claim 1 wherein said first air gap between said first flange and said flexible intermediate element has a first thickness, said second air gap between said second flange and said flexible intermediate element has a second thickness, and said third air gap between said middle portion of said flexible intermediate element and said outer insulating element has a third thickness, with each of said first and second thicknesses being smaller than said third thickness.

3. The flexible conduit assembly as set forth in claim 2 wherein said first and second thickness are substantially the same.

4. The flexible conduit assembly as set forth in claim 1 wherein each of said first and second air gaps is fluidly continuous with said third air gap.

5. The flexible conduit assembly as set forth in claim 1 wherein:
    said first extension has a first leg having first and second leg ends with said first leg end attached to said first end portion of said intermediate element and said first leg extending from said first end portion of said intermediate element in a direction substantially transverse to said first end portion, and said first extension further having a second leg coupled to said first leg at said second leg end and extending from said first leg in a direction substantially transverse to said first leg; and
    said second extension has a third leg having third and fourth leg ends with said third leg end attached to said second end portion of said intermediate element and said third leg extending from said second end portion of said intermediate element in a direction substantially transverse to said second end portion, and said second extension further having a fourth leg coupled to said third leg at said fourth leg end and extending from said third leg in a direction substantially transverse to said third leg.

6. The flexible conduit assembly as set forth in claim 1 wherein said first and second extensions are spaced from said first and second conduits, respectively.

7. The flexible conduit assembly as set forth in claim 1 wherein said middle portion of said flexible intermediate element has first and second end segments adjacent said first and second end portions, respectively, and has a remaining segment between said first and second end segments with each of said first and second flanges extending over said first and second end segments, respectively, and exposing said remaining segment of said middle portion to said third air gap.

8. The flexible conduit assembly as set forth in claim 1 wherein said middle portion has first and second segments adjacent said first and second end portions, respectively, and wherein:
said first flange has at least one wall with a portion of said wall being sloped and said wall defining a cylindrical shape, and said first flange surrounding said first end portion of said flexible intermediate element and surrounding said first segment of said middle portion; and
said second flange has at least one wall with a portion of said wall being sloped and said wall defining a cylindrical shape, and said second flange surrounding said second end portion of said flexible intermediate element and surrounding said second segment of said middle portion.

9. The flexible conduit assembly as set forth in claim 1 wherein said outer insulating element is directly attached to each of said first and second flanges.

10. The flexible conduit assembly as set forth in claim 1 wherein said first conduit comprises a first inner conduit and a first outer conduit and said second conduit comprises a second inner conduit and a second outer conduit with and said first outer conduit directly attached to said first extension and said first flange directly attached to said first outer conduit and said second outer conduit directly attached to said second extension and said second flange directly attached to said second outer conduit.

11. The flexible conduit assembly as set forth in claim 1 wherein said first conduit comprises a first inner conduit and a first outer conduit and said second conduit comprises a second inner conduit and a second outer conduit with said first inner conduit directly attached to said first bellows end and said second inner conduit directly attached to said second bellows end.

12. The flexible conduit assembly as set forth in claim 1 wherein said bellows comprises at least one flexible wall defining a continuous inner surface of said coupler with said continuous inner surface defining a bore for enabling the exhaust to pass through.

13. The flexible conduit assembly as set forth in claim 1 wherein said flexible intermediate element includes a braided metal.

14. The flexible conduit assembly as set forth in claim 1 wherein said outer insulating element has a single layer of insulating material for at least one of attenuating noise, resisting transmission of heat, and dampening vibration.

15. The flexible conduit assembly as set forth in claim 1 wherein said outer insulating element has multiple layers of insulating material for at least one of attenuating noise, resisting transmission of heat, and dampening vibration.

16. The flexible conduit assembly as set forth in claim 15 wherein said multiple layers of insulating material comprises a first layer of silicone and a second layer super wool.

17. The flexible conduit assembly as set forth in claim 15 wherein said multiple layers of insulating material comprises a first layer of woven fabric with an alumized coating, a second layer of high temperature glass, and a third layer of woven fabric.

18. A coupler for a flexible conduit assembly for transmitting exhaust from a combustion engine to an atmosphere, said coupler comprising:
a bellows having first and second bellows ends and a bellows length extending between said bellows ends defining a longitudinal axis;
a flexible intermediate element surrounding said bellows and having first and second end portions with said first bellows end in contact with said first end portion and said second bellows end in contact with said second end portion, and a middle portion between said first and second end portions;
a first flange disposed over said flexible intermediate element about said first end portion;
a second flange disposed over said flexible intermediate element about said second end portion;
an outer insulating element surrounding at least said middle portion of said flexible intermediate element and having first and second outer ends supported by said flanges;
a first extension coupled to said first end portion of said intermediate element and projecting outwardly from said intermediate element substantially transverse to said longitudinal axis with said first extension coupled to said first flange to space said first flange from said flexible intermediate element to define a first air gap between said first flange and said flexible intermediate element; and
a second extension coupled to said second end portion of said intermediate element and projecting outwardly from said intermediate element substantially transverse to said longitudinal axis with said second extension coupled to said second flange to space said second flange from said flexible intermediate element to define a second air gap between said second flange and said flexible intermediate element;
wherein said first and second spaced flanges dispose a portion of said outer insulating element above said middle portion of said flexible intermediate element to define a third air gap between said middle portion and said outer insulating element for decreasing heat transfer between said outer insulating element and said flexible intermediate element when the exhaust transmits through said coupler.

19. The coupler as set forth in claim 18 wherein said first air gap between said first flange and said flexible intermediate element has a first thickness, said second air gap between said second flange and said flexible intermediate element has a second thickness, and said third air gap between said middle portion of said flexible intermediate element and said outer insulating element has a third thickness, with each of said first and second thicknesses being smaller than said third thickness.

20. The coupler as set forth in claim 18 wherein each of said first and second air gaps is fluidly continuous with said third air gap.

21. The coupler as set forth in claim 18 wherein:
said first extension has a first leg having first and second leg ends with said first leg end attached to said first end portion of said intermediate element and said first leg extending from said first end portion of said intermediate element in a direction substantially transverse to said first end portion, and said first extension further having a second leg coupled to said first leg at said second leg end and extending from said first leg in a direction substantially transverse to said first leg; and said second extension has a third leg having third and fourth leg ends with said third leg end attached to said second end portion of said intermediate element and said third leg extending from said second end portion of said intermediate element in a direction substantially transverse to said second end portion, and said second extension further having a fourth leg coupled to said third leg at said fourth leg end and extending from said third leg in a direction substantially transverse to said third leg.

22. The coupler as set forth in claim 18 wherein said middle portion has first and second segments adjacent said first and second end portions, respectively, and wherein:
said first flange has at least one wall with a portion of said wall being sloped and said wall defining a cylindrical shape, and said first flange surrounding said first end portion of said flexible intermediate element and surrounding said first segment of said middle portion; and
said second flange has at least one wall with a portion of said wall being sloped and said wall defining a cylindrical shape, and said second flange surrounding said second end portion of said flexible intermediate element and surrounding said second segment of said middle portion.

23. The coupler as set forth in claim 18 wherein said outer insulating element is directly attached to each of said first and second flanges, and said first and second flanges are directly attached to said respective first and second end portions of said flexible intermediate element.

* * * * *